(12) United States Patent
Ruan (10) Patent No.: US 7,621,991 B2
(45) Date of Patent: *Nov. 24, 2009

(54) EXHAUST GAS COOLER AND PARTICULATE SCRUBBING SYSTEM

(76) Inventor: Ying Gang Ruan, 12014 W. 130th St., Overland Park, KS (US) 66213

( * ) Notice: Subject to any disclaimer, the term of this patent is extended or adjusted under 35 U.S.C. 154(b) by 382 days.

This patent is subject to a terminal disclaimer.

(21) Appl. No.: 11/622,413

(22) Filed: Jan. 11, 2007

(65) Prior Publication Data

US 2007/0245722 A1    Oct. 25, 2007

Related U.S. Application Data

(63) Continuation of application No. 10/875,728, filed on Jun. 24, 2004, now Pat. No. 7,163,571.

(51) Int. Cl.
B01D 47/02 (2006.01)
F01N 3/02 (2006.01)

(52) U.S. Cl. .......................................... 96/262; 96/354

(58) Field of Classification Search ................ 55/385.3, 55/DIG. 30; 95/228, 229, 226; 96/262, 329, 96/351, 354, 383, 278, 279; 60/688, 690, 60/693; 165/51, 181
See application file for complete search history.

(56) References Cited

U.S. PATENT DOCUMENTS

| 251,407 | A | | 12/1881 | Bruns |
| 1,421,432 | A | | 7/1922 | Embanks |
| 2,612,745 | A | | 10/1952 | Veechio |
| 2,789,032 | A | | 4/1957 | Bagley et al. |
| 2,830,673 | A | * | 4/1958 | Bungas ..................... 96/240 |
| 3,282,047 | A | * | 11/1966 | Wertheimer ................ 60/295 |
| 3,644,231 | A | | 2/1972 | Maruya et al. |
| 3,700,029 | A | | 10/1972 | Thrun |
| 3,793,807 | A | * | 2/1974 | Prem Das .................... 95/223 |
| 3,857,910 | A | | 12/1974 | Day |
| 3,875,743 | A | | 4/1975 | Mercer |
| 3,984,219 | A | | 10/1976 | Huang |
| 4,282,017 | A | | 8/1981 | Chen |
| 4,416,223 | A | | 11/1983 | Hashizume |
| 4,621,677 | A | | 11/1986 | Suzuki et al. |
| 4,960,546 | A | | 10/1990 | Tharp |
| 5,078,759 | A | | 1/1992 | Kira |

(Continued)

OTHER PUBLICATIONS

Johannes Hartick, article: "Issues & Trends", published by ArvinMeritor, pp. 1-5, revised May 2002.

(Continued)

Primary Examiner—Frank M Lawrence
(74) Attorney, Agent, or Firm—Hovey Williams LLP (57) ABSTRACT

An exhaust gas cooling and particulate scrubbing system for automobiles includes a first stage intercooler for initial, indirect cooling of the exhaust gas and a direct exhaust gas cooling and scrubbing device preferably positioned downstream in the exhaust system therefrom. The intercooler is designed to provide circulation of a liquid cooling medium by convection and has airflow ducts positioned within a surrounding jacket oriented to permit air to move therethrough during movement of the automobile. The a direct exhaust gas cooling and scrubbing device passes the exhaust gas through a liquid cooling medium whereby the exhaust gas is cooled in an effort to trap suspended particulates in the liquid cooling medium.

30 Claims, 10 Drawing Sheets

U.S. PATENT DOCUMENTS

| | | |
|---|---|---|
| 5,143,527 A | 9/1992 | Tian-Song |
| 5,175,998 A | 1/1993 | Simuni |
| 5,453,107 A | 9/1995 | Liu |
| 5,858,072 A * | 1/1999 | Motoda ................. 96/332 |
| 5,908,491 A | 6/1999 | Hobbs |
| 2005/0151281 A1 | 7/2005 | Tharp |

OTHER PUBLICATIONS

Web page: "Watching Your Exhaust Gas Temperature (EGT)", www.fast-diesel.com/docs/egt.html, published by Edgwater Products, Inc., pp. 1-2. No. date available—copyright notice 2003-2004.

* cited by examiner

EXHAUST GAS COOLER AND PARTICULATE SCRUBBING SYSTEM

RELATED APPLICATION

This application is a continuation of U.S. patent application Ser. No. 10/875,728, filed Jun. 24, 2004, now U.S. Pat. No. 7,163,571, which is incorporated by reference herein.

BACKGROUND OF THE INVENTION

1. Field of the Invention

This invention broadly concerns a system for removing objectionable particles from gasses and for cooling and scrubbing exhaust gas from internal combustion engines by passing the gas through a readily available liquid such as water. More particularly, it is concerned with a system which humidifies and removes particles from ambient air, and is also useful to lower the temperature of the exhaust gas and reduces the noise of the engine by causing the exhaust gas to be broken into small bubbles which creates greater contact with the cooling liquid.

2. Description of the Prior Art

The by-products of combustion in engines, particularly internal combustion engines, include exhaust gases which are discharged to the atmosphere. Typically, the exhaust gases are produced from a gasoline or diesel internal combustion engine at relatively high temperatures upon leaving the combustion chamber and are routed through an exhaust manifold to an exhaust pipe. Typically, the exhaust gas then passes through a muffler to attenuate the noise of the engine conveyed through the exhaust pipe. Among the gasses commonly present in exhaust gasses are hydrocarbons, nitrous oxides, and carbon monoxide. In addition, the exhaust gasses typically include suspended particulates, or components which will form particulates at ambient temperatures such as about 72° F.

In typical automotive gasoline or diesel internal combustion engines, the temperature of the exhaust gas in the exhaust pipe can be relatively high, measured by probes in the exhaust manifold in the order of 1300° F. or more, and at full load conditions, the temperature of the exhaust gas in typical internal combustion engines can be in the range of 750°-800° C. As a result, the exhaust gas conveyed to the atmosphere upon exiting the exhaust system, even when passing through a muffler, can still be both loud and contain a large amount of pollutants.

It is known to employ catalytic converters in exhaust systems in order to reduce pollutants in gasoline engines, and to use oxidation catalysts in cars with diesel engines. However, the combustion byproducts present in the exhaust gas still have an unpleasant odor and convey substantial pollutants to the atmosphere. There is thus a need for an improved system for reducing pollutants and cooling the temperature of the exhaust gasses from an engine.

In addition, many indoor environments also suffer from excessive dust, allergens and other particles in the air. One such indoor environment is involved in the manufacture of computer chips used in electronic applications, where dust and other particulates in the air may be deposited on the computer chips and interfere with the quality of the computer chip produced. Another such indoor environment is in hospital rooms, clinics or the homes of asthma or allergy sufferers where the presence of dust, pollen or other particulates gives rise to respiratory problems or allergic reactions. Furthermore, the heating of many indoor areas in cold winter climates significantly reduces the relative humidity of the air, producing an irritating dryness in the respiratory passages of the inhabitants.

SUMMARY OF THE INVENTION

The present invention provides substantial improvements in filtering and conditioning gasses, including cooling exhaust gasses in internal combustion engines. The improvements are achieved in several respects regarding automobile exhaust systems by employing a system using liquid to cool the exhaust gas. The system hereof features a first stage using an intercooler to initially cool the exhaust gas, and a second stage using direct contact between the exhaust gas and the liquid cooling medium by passing the exhaust gasses through a liquid, most preferably water. The water is cooled by the ambient air and the exhaust gasses are thereby kept at a much lower temperature than would otherwise be the case. In addition, I have perceived that both noise and unpleasant odors are reduced by passing exhaust gas through the system in accordance with the present invention. In addition, the second stage device as described above is useful when it receives a flow of a gas, such as ambient air, in connection with removing particulate matters and humidifying the air passing therethrough.

In the preferred embodiment of the system of the invention used in automotive exhaust systems, the exhaust gas is cooled by using two separate exhaust gas coolers. In a first stage, the exhaust gas is cooled by passing though an intercooler which keeps the exhaust gas isolated from the liquid cooling medium, and allowing ambient air to circulate through the intercooler. A direct exhaust gas cooling and scrubbing device causes the exhaust gas to be routed through the device in direct contact with the cooling liquid. Either the intercooler or the direct exhaust gas cooling and scrubbing device may be used separate from the other to cool exhaust gas from an engine. In addition, the direct exhaust gas cooling and scrubbing device may be used as a filtration and humidifying system for removing particulate matter and humidifying ambient air.

More particularly, the intercooler preferably includes a jacket which holds the liquid and surrounds an exhaust gas passage through the intercooler. A plurality of heat exchanger tubes are positioned in the exhaust gas passage and permit the flow of liquid through the tubes by convection. The tubes may be arranged transversely to the flowpath of the exhaust gas through the intercooler, and preferably in a normally upright orientation to promote convection. Most preferably, the intercooler jacket is provided with airflow tubes to permit the passage of air through the jacket. When installed in a vehicle, the airflow tubes are preferably substantially aligned with the direction of travel of the vehicle so as to facilitate the flow of air through the airflow tubes when the vehicle is moving to promote continued cooling of the liquid in the jacket.

The second stage of the system described above involves a direct cooling and scrubbing device involves a body having at least one, and preferably a plurality of chambers which hold cooling liquid such as water and through which the exhaust gas passes. The body includes internal baffles which direct the exhaust gas to a sparger which dissipates the exhaust gas into small bubbles in the chamber. The sparger, such as a fine mesh, is preferably positioned below the liquid-filled chamber so that the exhaust gas foams and bubbles upwardly through the liquid. The bubbles have a relatively large surface area to promote cooling of the exhaust gas which may result in trapping of particulates in the liquid. The continuous flow of the exhaust gas into the chamber causes the cooled exhaust gas to collect in an upper plenum where it may be routed to a second chamber and then exhausted. Replenishment of the liquid in the chambers is provided by reservoirs arranged within the body. The reservoirs include a small passage into the chambers, so that as water or other liquid is lost from the chambers, it is replenished from the reservoirs. The cooling liquid remaining in the chambers may be periodically drained to dispose of particulates and other undesirable chemicals trapped therein. For example, if the exhaust gas includes a component which reacts with the cooling liquid and remains resident with the liquid cooling medium in the chambers, drainage of the water and proper disposal will avoid releasing these chemicals to the atmosphere. The ability to drain and replenish the liquid in the chambers also permits the exhaust gas cooling and scrubbing device to be used to filter ambient air by trapping particulate matter therein which has the additional benefit of humidifying the air when water is used as the liquid medium in the chambers.

Two principle benefits are immediately noticeable from usage of the system hereof in an automotive application. First, the system provides a substantial reduction in exhaust noise. By causing the exhaust gas to be significantly cooled and passed through the liquid cooling medium, the resultant exhaust is quieter. Second, even after periods of use of up to 30 minutes, in an enclosed garage area, I have noticed that the noxious odor normally associated with exhaust gas from a gasoline engine is significantly reduced. In addition, the temperature of the exhaust gas is substantially reduced as it exits from the system, and I believe that the reduction in temperature and odor is indicative of the fact that my system is effectively trapping at least some of the combustion byproducts or converting them to a less odorous gas. It is further my belief that by cooling the exhaust gas, my system traps some particulates in the chambers and further reduces pollution and odor attributable to the exhaust gasses of most internal combustion engines.

DESCRIPTION OF THE PREFERRED EMBODIMENT

Referring now to the drawings, the exhaust gas cooler and particulate scrubbing system 20 hereof includes an intercooler 22 which is designed to be coupled to an exhaust pipe 24 receiving exhaust gas from an internal combustion engine, and a direct exhaust gas cooling and scrubbing device 26. While each of the intercooler 22 and direct exhaust gas cooling and scrubbing device 26 may be used independently of each other and fluidically coupled to receive the exhaust gas, improved cooling of the exhaust gas results from positioning the intercooler 22 upstream of the direct exhaust gas cooling and scrubbing device 26 so that the exhaust gas is initially cooled by the intercooler 22 before passage to the direct exhaust gas cooling and scrubbing device 26. This arrangement also lowers the temperature of the exhaust gas received by the direct exhaust gas cooling and scrubbing device 26. The system 20 is particularly adapted for use with automobiles 28 shown schematically in FIG. 1, having an internal combustion engine 30 such as a gasoline or diesel engine, and a drivetrain 32. The engine 30 generates exhaust gas as a byproduct of combustion, which exits the engine 30 via an exhaust system 34 which incorporates the cooler and particulate scrubbing system 20 of the present invention therein. The exhaust system 34 in accordance with the present invention for a typical automotive application equipped with a gasoline engine includes an exhaust manifold 36, the exhaust pipe 24 leading to a catalytic converter 38, a muffler 39, and then to the intercooler 22 with the direct exhaust gas cooling and scrubbing device 26 positioned downstream therefrom. Alternatively, the system 20 hereof may be used downstream of the muffler 39 in the exhaust system 34 and or in lieu of the muffler 39.

Figure 1:
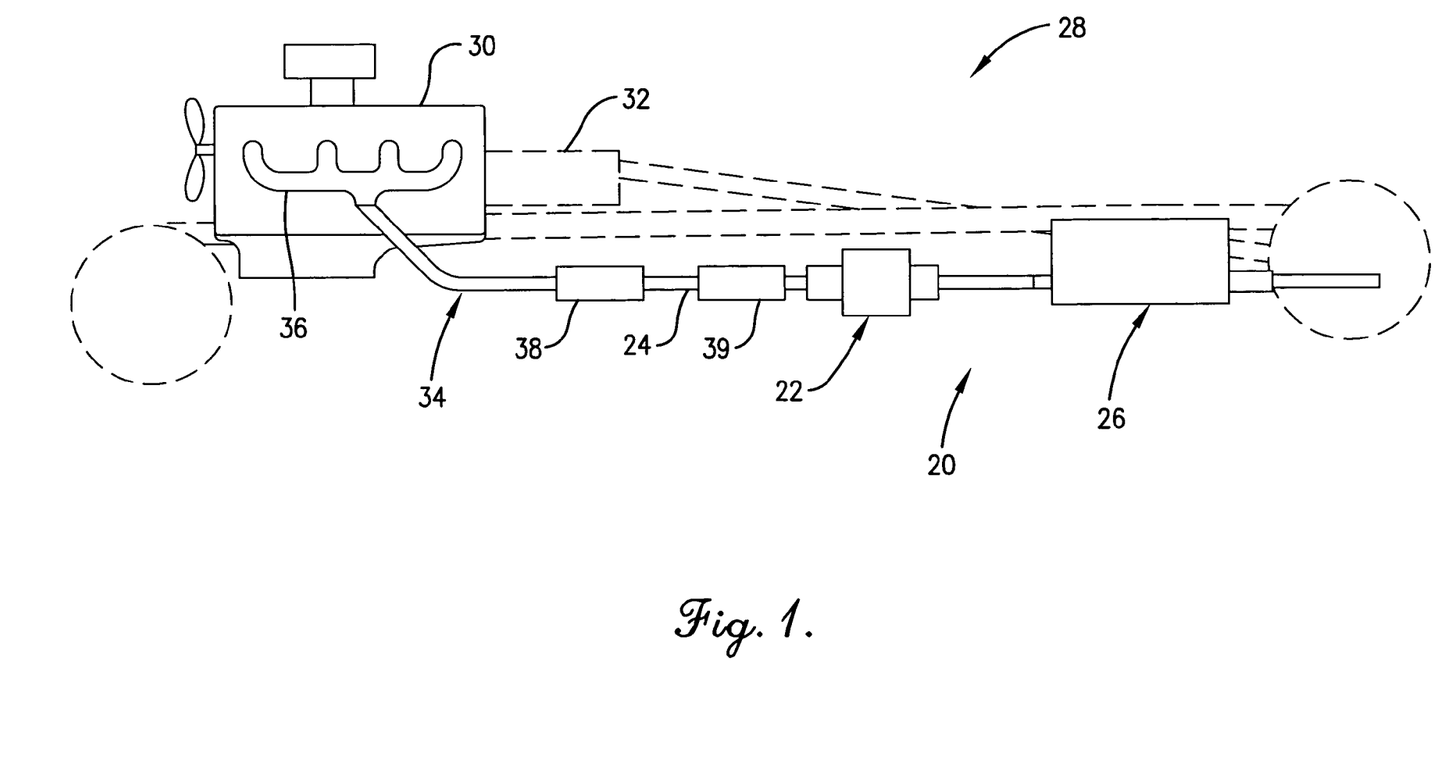
FIG. 1 is a schematic drawing of the exhaust gas cooler and particulate scrubbing system of the present invention shown connected to an internal combustion engine of an automobile, with the chassis, transmission and wheels shown in dashed lines for clarity.
Figure 2:
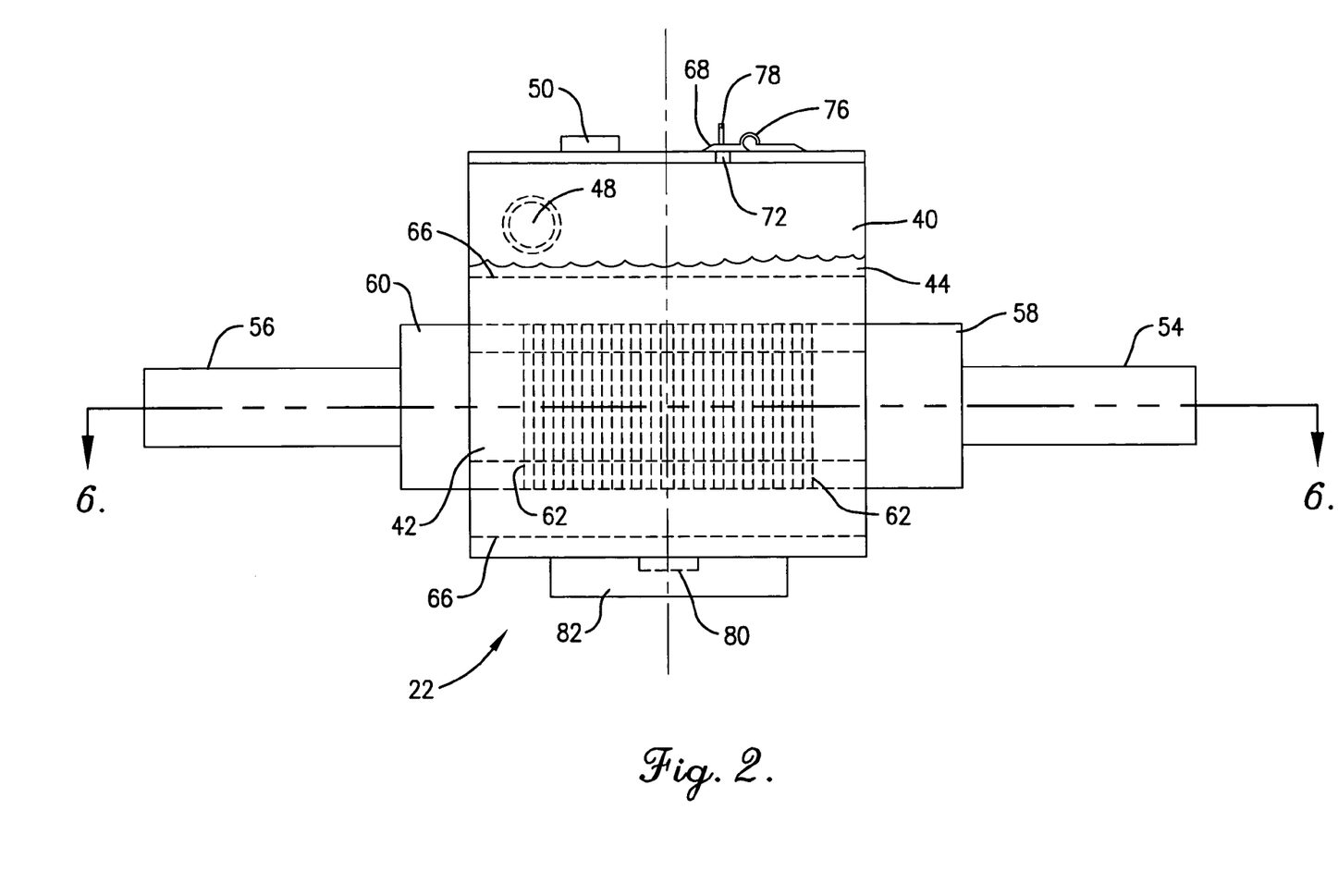
FIG. 2 is a left side elevational view of the intercooler of the system of the present invention, showing the drain plug, the airflow ducts, the side fill cap and the internal heat exchange tubes in dashed lines.
Figure 3:
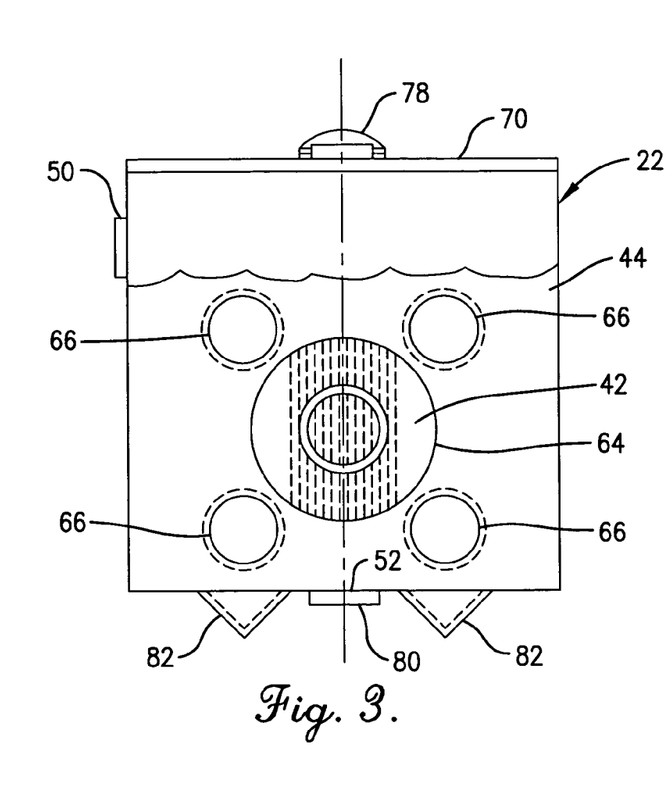
FIG. 3 is a front end elevational view of the intercooler of the system of the present invention, showing the position of the vertical tubes within the cooling channel and the positioning of the airflow ducts around the cooling channel.
Figure 4:
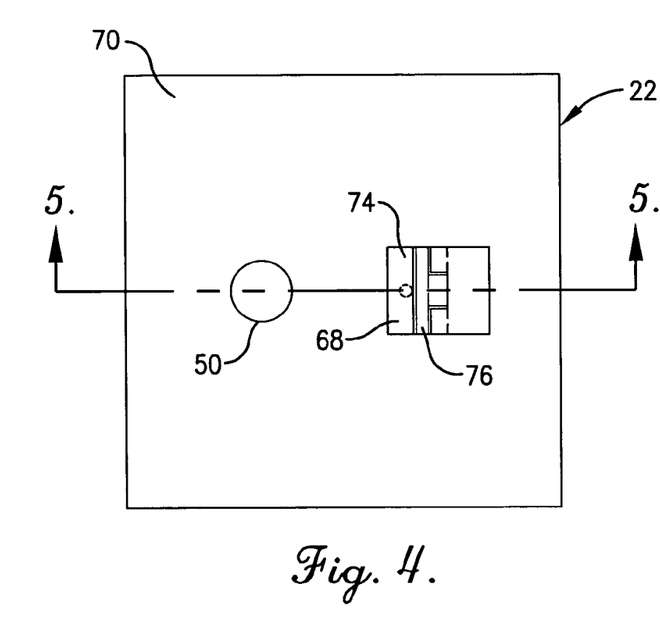
FIG. 4 is a partial top plan view of the jacket of the intercooler hereof but not including the pipes and expansions, and illustrating the hinged vent and the fill cap on the top wall of the jacket.

FIGS. 2 through 6 illustrate the preferred intercooler 22 hereof in greater detail. The intercooler 22 functions as an indirect heat exchanger whereby heat from the exhaust gas is transferred to the liquid cooling medium therein and to the surrounding environment, particularly the atmosphere surrounding the intercooler 22. The intercooler 22 broadly includes a jacket 40 which surrounds a cooling channel 42. The jacket 40 is designed to hold a quantity of a cooling liquid 44 such as water therein and which may be filled to a desired level through fill openings 46 or 48 located in the upper part of the jacket 40, each provided with suitable caps 50, while the water may be drained from the jacket 40 through drain opening 52 on the bottom of the jacket 40. Inlet pipe 54 is tubular and configured to receive exhaust gas from the manifold 36 and the exhaust pipe 24, and delivers the flow of exhaust gas to the cooling channel 42, and a discharge pipe 56 is sized and positioned to receive the flow of exhaust gas from the cooling channel and deliver the gas downstream to the direct exhaust gas cooling and scrubbing device 26, either directly or through a connecting pipe as shown in FIG. 1. The inlet pipe 54 and the discharge pipe 56 are tubular and have longitudinal axes which are preferably parallel to one another and the longitudinal axis of the channel 42, and most preferably the axes of the inlet pipe 54 and the discharge pipe 56 are in axial alignment. The cooling channel 42 includes expansions 58 and 60 which connect to the inlet pipe 54 and discharge pipe 56 but are of a greater internal diameter than either. The expansions 58 and 60 are positioned outside of the jacket, and substantially correspond to the internal diameter of the cooling channel 42. The increased internal diameter of the expansions 58 and 60 and the cooling channel 42 relative to the diameter of the inlet pipe 54 and the discharge pipe 56 help to increase the surface area for contact with the wall of the jacket surrounding the liquid 44, increase the residence time of the exhaust gas within the intercooler 22, and promote turbulent flow within the cooling channel 42. FIGS. 2, 3 and 4 show the jacket 40 as having a substantially cubical shape, but the jacket may have any other shape such as cylindrical or otherwise with provides for the cooling liquid to surround the cooling channel 42.

Figure 6:
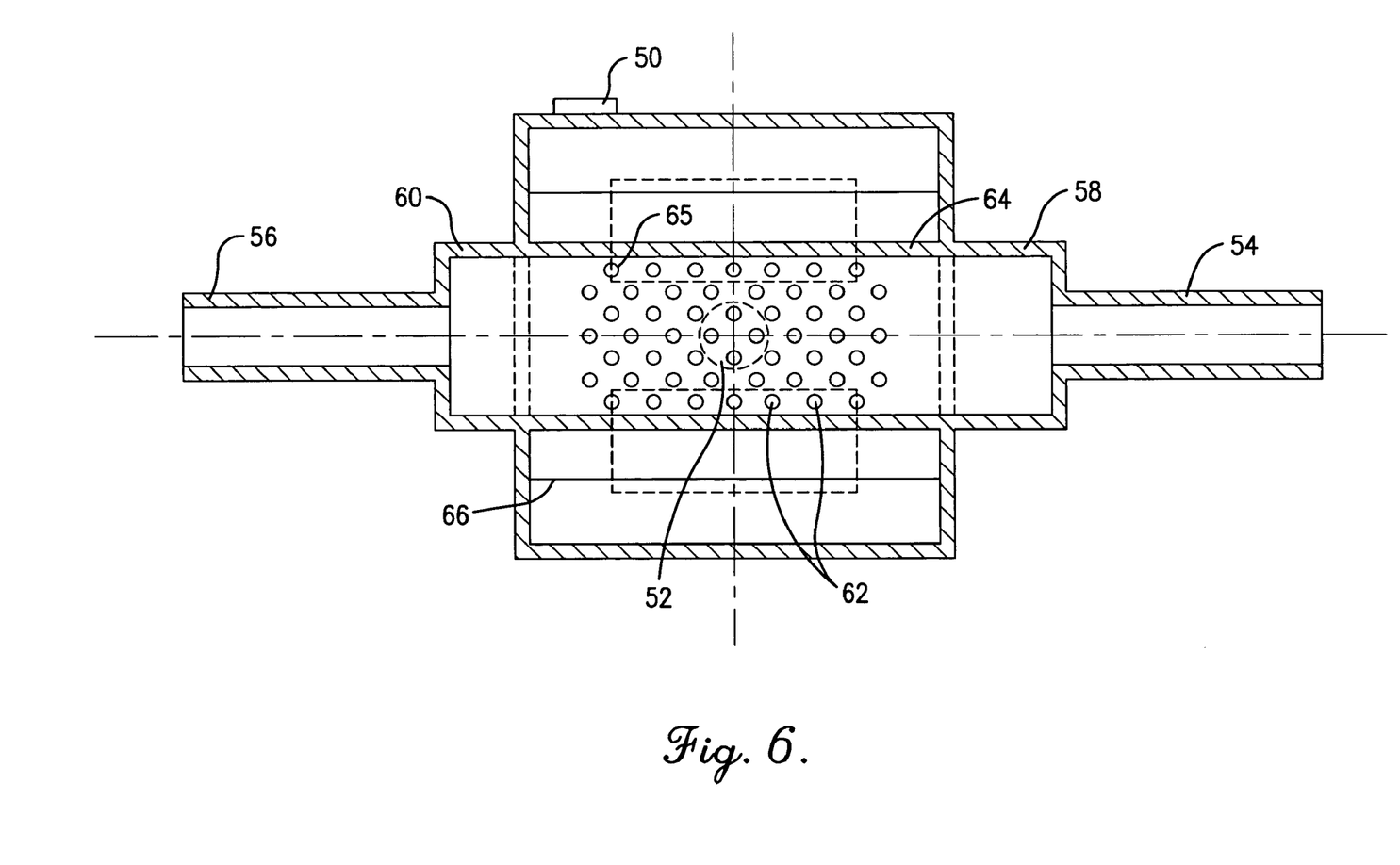
FIG. 6 is horizontal sectional view taken along line 6-6 of FIG. 2 to illustrate the opening in the wall surrounding the cooling channel and the arrangement of the tubes which permit liquid to circulate therethrough for cooling the exhaust gas in the cooling channel.

The jacket 40 is preferably provided with a plurality of small, vertical tubes 62 which cross the cooling channel 42 so that exhaust gas may readily pass over the tubes 62 which act as heat exchangers. The tubes 62 communicate with the liquid 44 in the jacket by virtue of their connection to a wall 64 surrounding and defining the cooling channel 42 at holes 65 in the wall 64 aligned with the tubes 62. Cooling liquid flows through the tubes 62, which may be provided with fins to have a greater heat exchange surface with the exhaust gas. As shown in the drawings, the cooling liquid flows by natural convection through the tubes 62, but it may be appreciated that impellers driven either by airflow or by electrical motors could be positioned in the jacket to assist in moving the cooling liquid through the tubes 62 if desired.

The jacket 40 also includes a plurality of airflow ducts 66 therethrough which are positioned around the cooling channel 42. The airflow ducts 66 are preferably arranged to be generally parallel with each other and aligned with the direction of travel of the automobile so that during movement of the automobile along the roadway, ambient air will be directed through the airflow ducts 66. Thus, the airflow ducts 66 in the preferred embodiment are arrayed in generally even spacing away from the cooling channel 42 and from each other, and oriented generally parallel with the inlet pipe 54 whereby ambient air will flow through the airflow ducts 66 (as illustrated by the arrows in FIG. 2) to cool the liquid 44 within the jacket 40 as the automobile moves.

Figure 5:
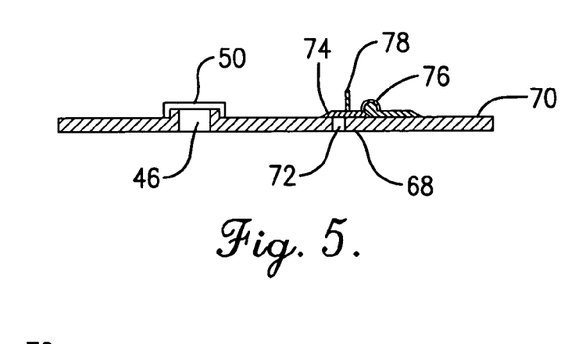
FIG. 5 is a fragmentary vertical sectional view taken along line 5-5 of FIG. 4, showing the top wall of the intercooler with one of the fill openings and the vent hole covered by the hinged flap.

It is anticipated that the high temperatures of the exhaust gas flowing through the cooling channel 42 will substantially raise the temperature of the cooling liquid 44 when the engine is operating for a significant period. To avert overpressurizing the jacket 40 due to steam generation, a vent 68 is provided in the top wall 70 of the jacket 40. As seen in FIGS. 4 and 5, the vent 68 includes a hole 72 in the top wall 70 for permitting the escape of steam, but the hole 72 is normally covered by a flap 74 connected to the top wall 70 by a hinge 76. The flap 74 is provided with an air dam 78 so that during movement of the automobile along a roadway, the movement of the air (shown by the arrows in FIG. 2) striking the air dam urges the flap 74 downwardly and against the hole 72. The force developed by baffle 78 during such movement may be overcome by steam generated within the jacket to prevent overpressurization and damage to the jacket 40. In order to refresh the amount of cooling liquid 44 within the jacket, additional liquid 44 may be introduced by removing the caps 50 for either of the fill openings 46 or 48 to pour additional cooling liquid into the jacket 40. If the cooling liquid 42 becomes fouled or otherwise needs to be flushed, the user may remove a drain plug 80 and drain the liquid through drain opening 52. Ribs 82 along the bottom 84 of the jacket 40 provide additional cooling to the jacket 40 and help to protect the drain plug 80 from damage.

The direct exhaust gas cooling and scrubbing device 26 is illustrated in FIGS. 7 through 15. The direct exhaust gas cooling and scrubbing device 26 includes a body 86, an entry pipe 88 and an exit pipe 90, the body 86 including a first stage chamber 92 and a second stage chamber 94 separated by a partition 96, and a first reservoir 98*a* and a second reservoir 98*b* extending along the sides of the chambers 92 and 94. The chambers 92 and 94 also include respective mounts 100 and 102, and a sparger system 104 including the sparger cartridges illustrated in FIGS. 12, 12, 14 and 15.

The body 86 is provided with a bottom wall 106, a removable top wall 108, side walls 110 and 112, and end walls 114 and 116. The entry pipe 88 is connected at an opening in the end wall 114 to introduce exhaust gas into the body 86, while the exit pipe 90 is provided with a greater internal cross-sectional area than the entry pipe 88 in order to reduce backpressure in the direct exhaust gas cooling and scrubbing device 26. A first upright baffle wall 118 directs exhaust gas received from the entry pipe 88 upwardly to a first entry opening 120 adjacent the top wall 108. The opening 120 is positioned adjacent the top wall 108 to inhibit cooling liquid 44 (which is present preferably to at least about a level L shown in FIG. 7) such as water from moving into the passage 122 between the end wall 114 and the baffle wall 118. A first forward wall 124 is spaced rearwardly of the baffle wall 118 to permit exhaust gas moving through the opening 120 to move downwardly and into a first plenum 126. A perforated base wall 128 is positioned to extend rearwardly of the first forward wall 124 and has a first plenum barrier wall 130 extending downwardly from the rear end of the perforated base wall to connect with the bottom wall 106. A plurality of holes 132 are spaced across the perforated base wall 128 which helps to initially disperse and break the exhaust gas flow into the first plenum 126 into a plurality of small flow streams.

The mounts 100 and 102 each include a front catch 134 and a rear catch 136 which hold therebetween a sparger cartridge 138 which together with the perforated base wall 120 acts as a sparger 104 to disperse the flow of the exhaust gas in the chambers 92 and 94, as illustrated in FIGS. 12, 13, 14 and 15. The sparger cartridge 138 is preferably provided to include a removable cartridge 138 having a generally upright side wall 140 and inwardly extending top rim 142 and inwardly extending bottom rim 144. The top rim 142 and the bottom rim 144 surround an open center area 146 to allow the flow of exhaust gas passing upwardly through the holes 132 therethrough. A variety of different sparging materials may be used to diffuse the exhaust gas flowing through the sparger 104 into smaller gas bubbles. For example, steel wool, glass fiber wool, or other materials may be used. As illustrated herein, the sparging material includes a plurality of layers of mesh screens 148. The mesh screens 148 may be of any size desired but should not be too fine so as to cause undue backpressure in the exhaust line. One side of the cartridge 138 is provided with an opening 150 to allow insertion and removal of the mesh screens 148. A small tab 152 is provided on the top rim 142 which is releaseably coupled with the rear catch 136, the rear catch 136 being resiliently yieldable to permit the cartridge 138 to slide beneath and be held by the catches 134 and 136, with the rear catch 136 holding the tab 152.

L-shaped spray barriers 154 and 156 extend into each of the chambers 92 and 94, and are coupled to the front partition 96 and back partition 158, respectively, positioned more proximate the top wall 108 than the bottom wall 106. The spray barriers 154 and 156 are positioned generally forwardly of second entry opening 160 in the front partition 96 and exit opening 162 in the back partition 158 to inhibit cooling liquid 44 from being carried through the openings 160 and 162. Each of the spray barriers include a base leg 164 and an upright leg 166, the base leg 164 including at least one and preferably a plurality of drainage holes 168 therethrough to permit cooling liquid 44 collected therein by spraying or condensation to drain back into the chambers 92 and 94, respectively.

Chamber 94 is configured generally similarly to chamber 92, in that exhaust gas received from the second entry opening 160 passes between the first partition and a second forward wall 170. The second entry opening 160 is positioned adjacent the top wall 108 to inhibit cooling liquid 44 (which is present preferably to at least about a level L shown in FIG. 7) such as water from being carried into the second chamber 92. Exhaust gas moves downwardly through a second passage 172 between the front partition 96 and the second forward wall 170 spaced rearwardly from the front partition 96. Exhaust gas moves through the second passage 172 into a second plenum 174. Second plenum 174 has a perforated base wall 176 positioned above the second plenum 174, the perforated base wall 176 extending rearwardly of the second forward wall 170 and has a second plenum barrier wall 178 extending downwardly from the rear end of the perforated base wall 176 to connect with the bottom wall 106. A plurality of holes 132 are spaced across the second plenum barrier wall 178 which helps to initially disperse and break the exhaust gas flow into the second plenum 174 into a plurality of small flow streams. A sparger 104, as shown in FIGS. 12, 13, 14 and 15, is mounted in mount 102.

Exhaust gas moving over the spray barrier 156 passes through exit opening 162 in the back partition 158, downwardly between the back partition 158 and the rear end wall 116, and out through the exit pipe 90.

Figure 10:
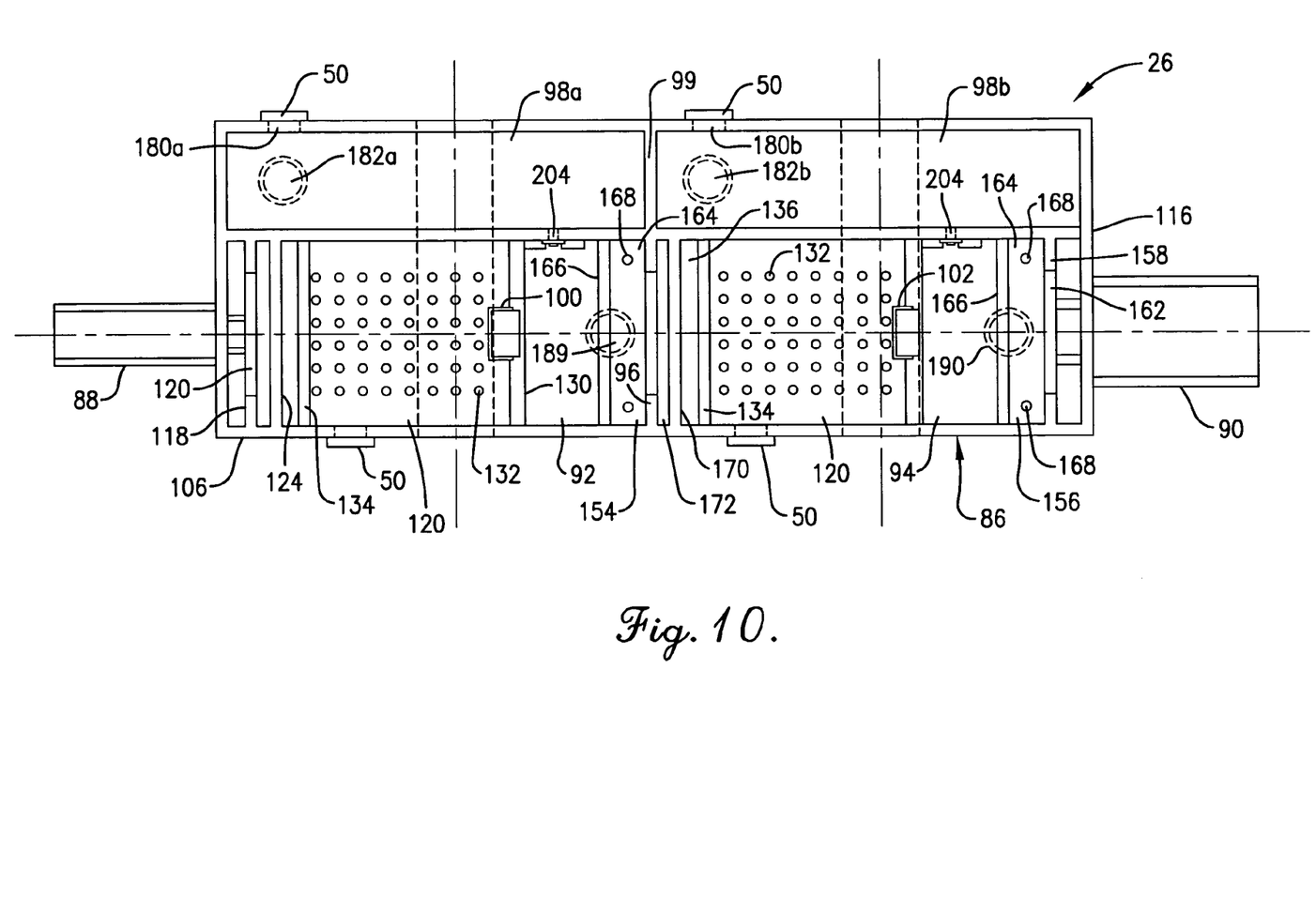
FIG. 10 is a horizontal cross-sectional view through the device of the present invention with the sparging cartridges removed showing the openings in the perforated base wall for dispersing the exhaust gas flow in each of the chambers.
Figure 11:
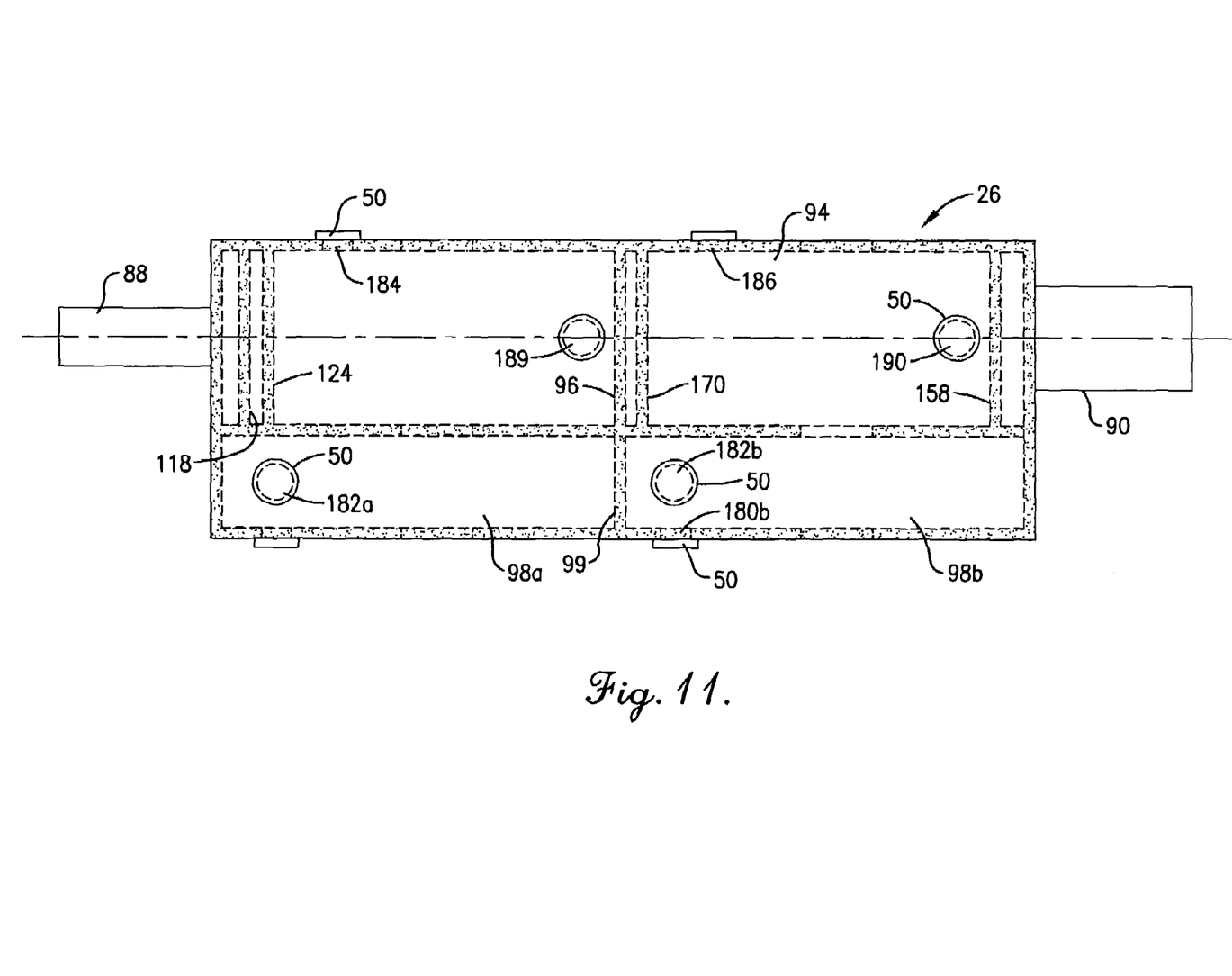
FIG. 11 is an inverted bottom view of the device of the present invention showing the drainage openings in the bottom wall of the device.
Figure 12:
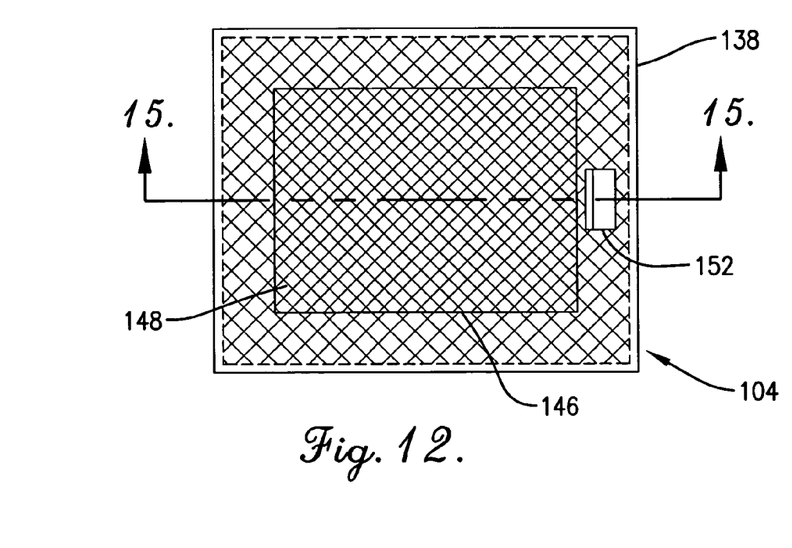
FIG. 12 is a top plan view of a sparging cartridge for mounting above the perforated base wall in each of the chambers.
Figure 13:
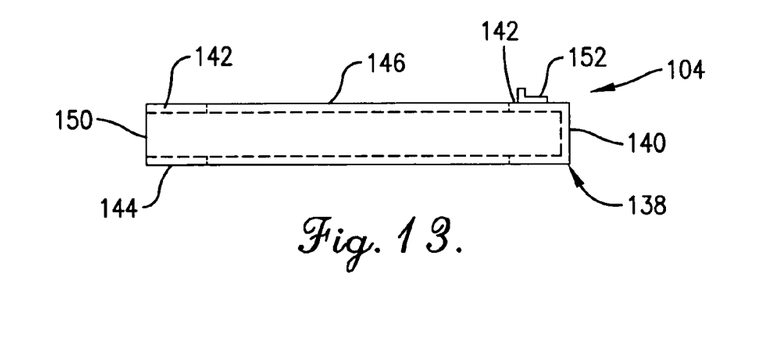
FIG. 13 is a side elevational view of the sparging cartridge showing the mounting tab and the opening in the side wall for insertion and removal of the mesh screens of the cartridge.
Figure 14:
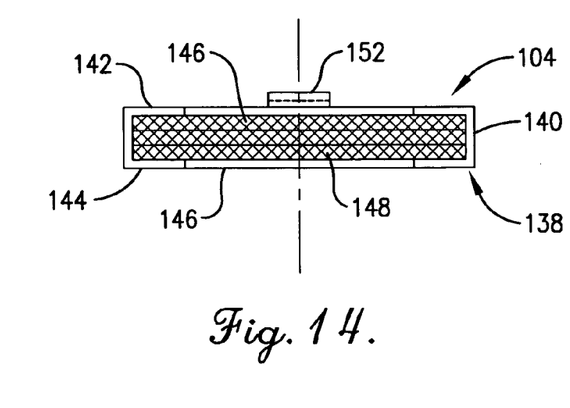
FIG. 14 is an end view of the sparging cartridge of FIGS. 12 and 13, showing the central opening for permitting the flow of exhaust gas therethrough.
Figure 15:
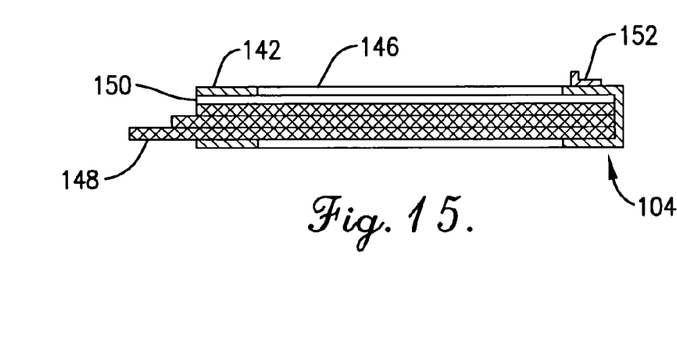
FIG. 15 is a vertical cross sectional view through the sparging cartridge of FIGS. 12 and 13 showing the mesh screens partially extended through the opening in the side wall for permitting removal and replacement of the screens.

The level L of the cooling liquid 44 in the first and second chambers 92 and 94 is respectively maintained from the first reservoir 98a and the second reservoir 98b which extend along one side of the chambers 92 and 94. The first reservoir 98a and second reservoir 98b are separated by a reservoir barrier wall 99 such that each reservoir 98a, 98b is substantially equal in size. FIG. 10 shows the reservoirs 98a, 98b which are initially filled with cooling liquid 44 through a first side fill opening 180a and a second side fill opening 180b, respectively. The cooling liquid 44 may be drained from the first reservoir 98a through drain opening 182a. Similarly, the cooling liquid 44 may be drained from the second reservoir 98b through drain opening 182b. Each drain opening 182a, 182b is provided with caps 50. Also, first chamber fill opening 184 and second chamber fill opening 186 facilitate initial charging of the chambers 92 and 94 with cooling liquid.

While a single reservoir could be used to maintain liquid in both chambers, the use of two reservoirs 98a, 98b inhibits reservoir water from rising to unacceptable levels due to the usually increased pressure in chamber 92 communicated to the reservoir relative to the pressure communicated by 94. In the preferred embodiment illustrated in the drawings, the two reservoirs 98a, 98b function independently in terms of reservoir water, as each reservoir 98a, 98b includes separate fill openings 180a, 180b and drain openings 182a, 182b. Additionally, the two reservoirs 98a, 98b provide at least a partial jacket to both cool the chambers and reduce the noise attributed to the scrubbing device 26.

The reservoirs 98a, 98b have a further beneficial effect of providing a water jacket cooling effect along at least one side of the chambers 92 and 94. The removable top wall 108 covers the reservoirs 98a, 98b as well as the chambers 92 and 94, and an upright reservoir wall 188 is provided to separate the reservoirs 98a, 98b from the chambers 92 and 94. The chambers 92 and 94 may be drained by respective drain openings 189 and 190, each being provided with caps 50.

Figure 7:
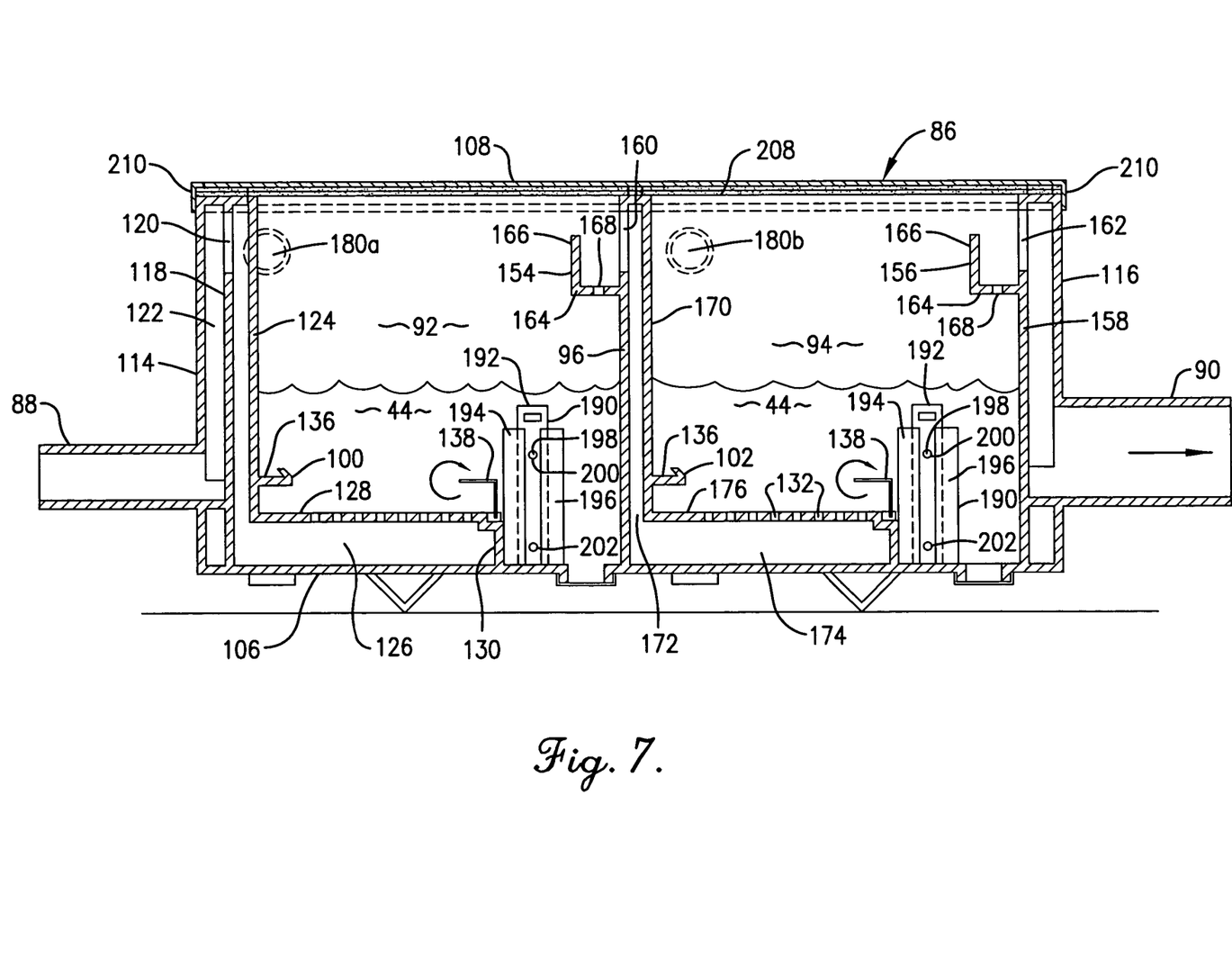
FIG. 7 is a vertical cross-sectional view of the direct exhaust gas cooling and scrubbing device of the present invention with the sparger cartridges removed and showing the level of the cooling liquid medium held in the chambers for direct contact with the exhaust gas, and showing the relative size of the entry pipe and the exit pipe.
Figure 8:
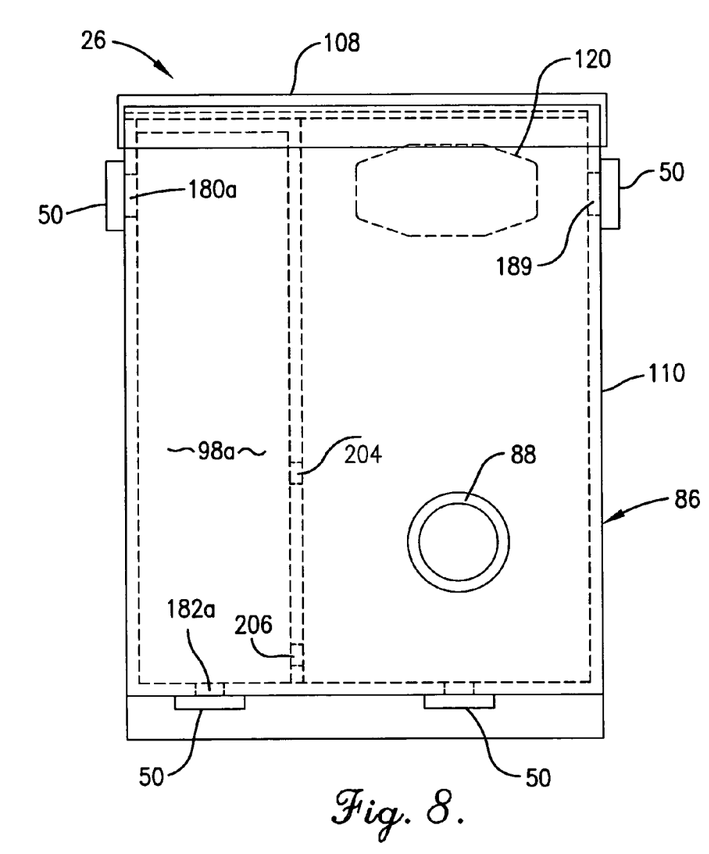
FIG. 8 is an end elevational view of the front end showing the upright wall separating a first reservoir from the first chamber, the entry pipe and the first entry opening positioned adjacent the top wall of the body of the device.
Figure 9:
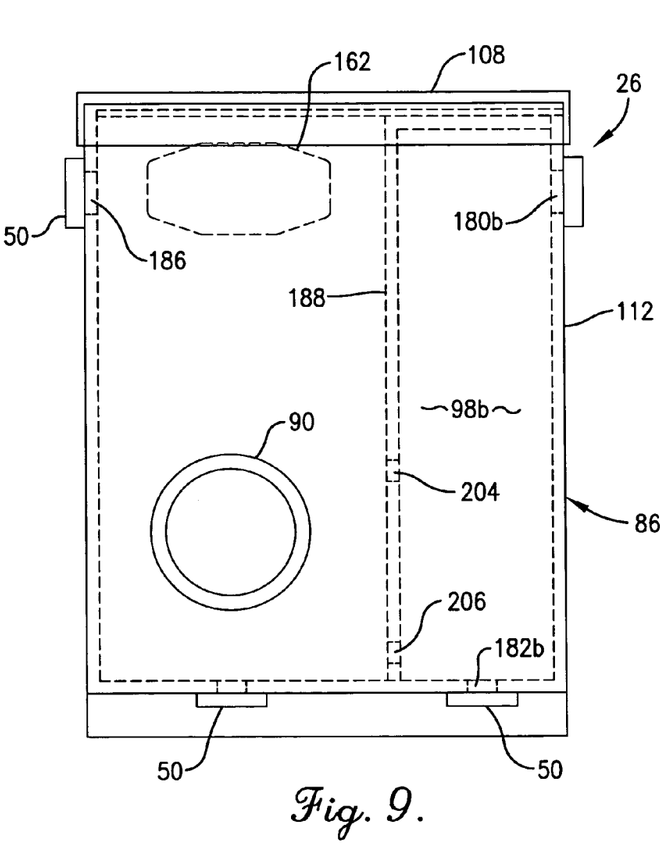
FIG. 9 is an end elevational view of the rear end showing a second chamber, the exit opening in the back partition, and the caps covering the drainage openings in a bottom wall of the body of the device.

As may be seen in FIGS. 7 and 10, the direct exhaust gas cooling and scrubbing device 26 includes a self-filling apparatus 190 which permits cooling liquid 44 in the reservoirs 98a, 98b to gradually migrate into the chambers 92 and 94 as the liquid therein evaporates or is otherwise exhausted. Self-filling apparatus 190 includes a slide member 192 which is held against the upright reservoir wall 188 by retainers 194 and 196. The retainers 194 and 196 hold the slide member 192 against the upright reservoir wall 188 but permit the slide member 192 to be moved or removed, if desired. The slide member 192 includes an upper hole 198 which has a removable resilient stopper 200 of rubber or the like received therein, and a lower hole 202. The upright reservoir wall 188 has an upper passage 204 and a lower passage 206 therethrough which are complementally sized and positioned relative to the respective upper hole 198 and lower hole 202 of the slide members 192 positioned in each of the chambers 92 and 94. Thus, there are two upper passages 204 and two lower passages 206 in the upright reservoir wall 188, one of each passage 204 and 206 positioned for communication between the reservoirs and a respective one of the chambers 92 and 94.

The removable top wall 108 is sealingly engaged with the top edge of each of the side walls 110 and 112, the end walls 114 and 116, and the upright reservoir wall 108, preferably by a seal 208 of resilient material such as rubber. The top wall 108 is preferably clamped down tightly against the seal 208 by clamps 210. Simple hasp-type clamps are shown in FIG. 7, but it may be appreciated that a variety of different clamping members may be employed to hold the top wall 108 tightly against the seal 208.

To prepare the system 20 hereof for use, the operator first fills the intercooler 24 and the direct exhaust gas cooling and scrubbing device 26 with cooling liquid 44. The intercooler 24 can be filled through either fill opening 46 or 48, while for the direct exhaust gas cooling and scrubbing device 26, the operator separately fills each of the chambers 92 and 94 and the reservoirs 98a, 98b. The cooling liquid 44 is most preferably water, as vaporization of the cooling liquid 44 will result in the liquid being carried to the atmosphere, and water has fewer drawbacks from a pollution standpoint than other liquid, and is readily available. However, other combinations of water and other liquids may be required in some climates due to temperature considerations.

In use, the ignition of the fuel in the engine 30 produces a variety of combustion by-products including particulates carried with the exhaust gas. As the gas moves through the exhaust pipe 24, it is routed to the intercooler 22. In the intercooler, the exhaust gas moves through the channel 42, whereby it is cooled by the surrounding cooling liquid 44. In addition, the exhaust gas flows past the vertical tubes 62 which provides further cooling. As heat is transferred into the intercooler, and particularly to the vertical tubes 62, convection is initiated to circulate liquid inside the intercooler jacket 40. This promotes further cooling of the exhaust gas. As the automobile moves along the road, a flow of air developed by the movement of the automobile begins to flow through the airflow ducts 66. This helps to dissipate heat which builds up in the cooling liquid 44 as the air moving through the airflow ducts 66 receives heat from the cooling liquid 44. In order to avoid problems which may develop due to overpressurization of the jacket 40, vapor may pass through hole 72 adjacent the vent 68. The pressure of the vapor will be sufficient to overcome the downward force of the vent flap 74 on the hole 72.

After initial cooling of the exhaust gas in the intercooler 22, the exhaust gas moves downstream to the direct exhaust gas cooling and scrubbing device 26. Whereas the exhaust gas is maintained separate from the cooling liquid 44 in the intercooler 22 by the wall 64, in the direct exhaust gas cooling and scrubbing device 26, the exhaust gas directly contacts the cooling liquid 44. The exhaust gas moves into the direct exhaust gas cooling and scrubbing device 26 through the entry pipe 88, then through the passage 122 to the first plenum 126. By being routed downwardly into the first plenum 126, the exhaust gas then moves up through the holes 132 in the perforated base wall 128 which disperses the exhaust gas flow. The exhaust gas is further dispersed into small bubbles to afford a greater surface area of the exhaust gas by movement through the sparger 104. Such a flow causes rapid bubbling and frothing of the cooling liquid by its contact with the exhaust gas, while the cooling liquid 44 in turn rapidly cools the exhaust gas. The initial, unactivated level L of the cooling liquid in the chambers 92 and 94 is high enough to cover the sparger 104, yet initially sufficiently below the top wall 108 to permit the bubbling and frothing action of the exhaust gas and cooling liquid 44 in the chambers 92 and 94 above the initial liquid level L. Because of the vigorous bubbling and frothing action of the cooling liquid 44 and the exhaust gas, the spray barriers 154 and 156 help to inhibit liquid from flowing out of the respective chambers 92 and 94 and through the respective openings 160 and 162. Similarly, the first forward wall 124 and the first upright baffle wall 118 inhibit the passage of liquid forwardly into the flow of exhaust gas, although the constant influx of exhaust gas also helps to avoid this circumstance. While this direct cooling action occurs in chambers 92 and 94 as illustrated, it may be appreciated that additional chambers 92 and 94 can be added.

Because the cooling liquid 44 is directly in contact with the exhaust gas and is permitted a fluid flowpath from the entry pipe 88 to the exit pipe 90, and the openings 120, 160 and 162 into and from the chambers 90 and 92 avoid overpressurization of the body 86 of the direct exhaust gas cooling and scrubbing device 26. However, the direct contact of the exhaust gas with the cooling liquid 44, while beneficial for cooling the exhaust gas, also results in some of the cooling liquid 44 being vaporized and thus eventually exhausting the supply of cooling liquid in the chambers 92 and 94. In order to replenish the cooling liquid 44 in the chambers 92 and 94, cooling liquid 44 is maintained in the reservoirs 98a, 98b. The cooling liquid 44 slowly migrates into the chambers 92 and 94 because the holes 198 and 202 and the passages 204 and 206 are sufficiently small that only a small amount of liquid may pass therethrough and the sealing effect of the top wall 108 inhibits the entry of air into the reservoirs 98a, 98b thus creating a partial vacuum. Only as air gradually seeps into the reservoir 98a, 98b and cooling liquid is exhausted does additional cooling liquid 44 flow from the reservoirs 98a, 98b into the chambers 92 and 94. If additional flow of cooling liquid 44 is desired, the stoppers 200 may be removed, thus increasing the liquid flow into the chambers 92 and 94. This may be necessary, for example, when the automobile 28 is operated in warmer climates or when the flow of exhaust gas is expected to be relatively high for a sustained period.

By virtue of the initial cooling in the intercooler 22, the exhaust is substantially cooler than would be the case absent the intercooler. The flow of the air through the airflow ducts 66 helps to avoid overheating and excessive evaporation of the cooling liquid 44 in the intercooler 22. By first cooling the exhaust gas in the intercooler 22, less vaporization is encountered in the direct exhaust gas cooling and scrubbing device 26. Moreover, the cooling in each of the intercooler 22 and the direct exhaust gas cooling and scrubbing device 26 helps to cool the exhaust gas. It is believed that the cooling of the exhaust gas and the direct contact between the exhaust gas and the cooling liquid will help to trap some of the particulates found in the exhaust gas having a particularly objectionable odor. As the particulates cool and are trapped in the direct exhaust gas cooling and scrubbing device 26, they may settle on the bottom wall 106 of the device 26, where by periodical draining, the particulates can be removed for further processing and without releasing them to the atmosphere.

Figure 16:
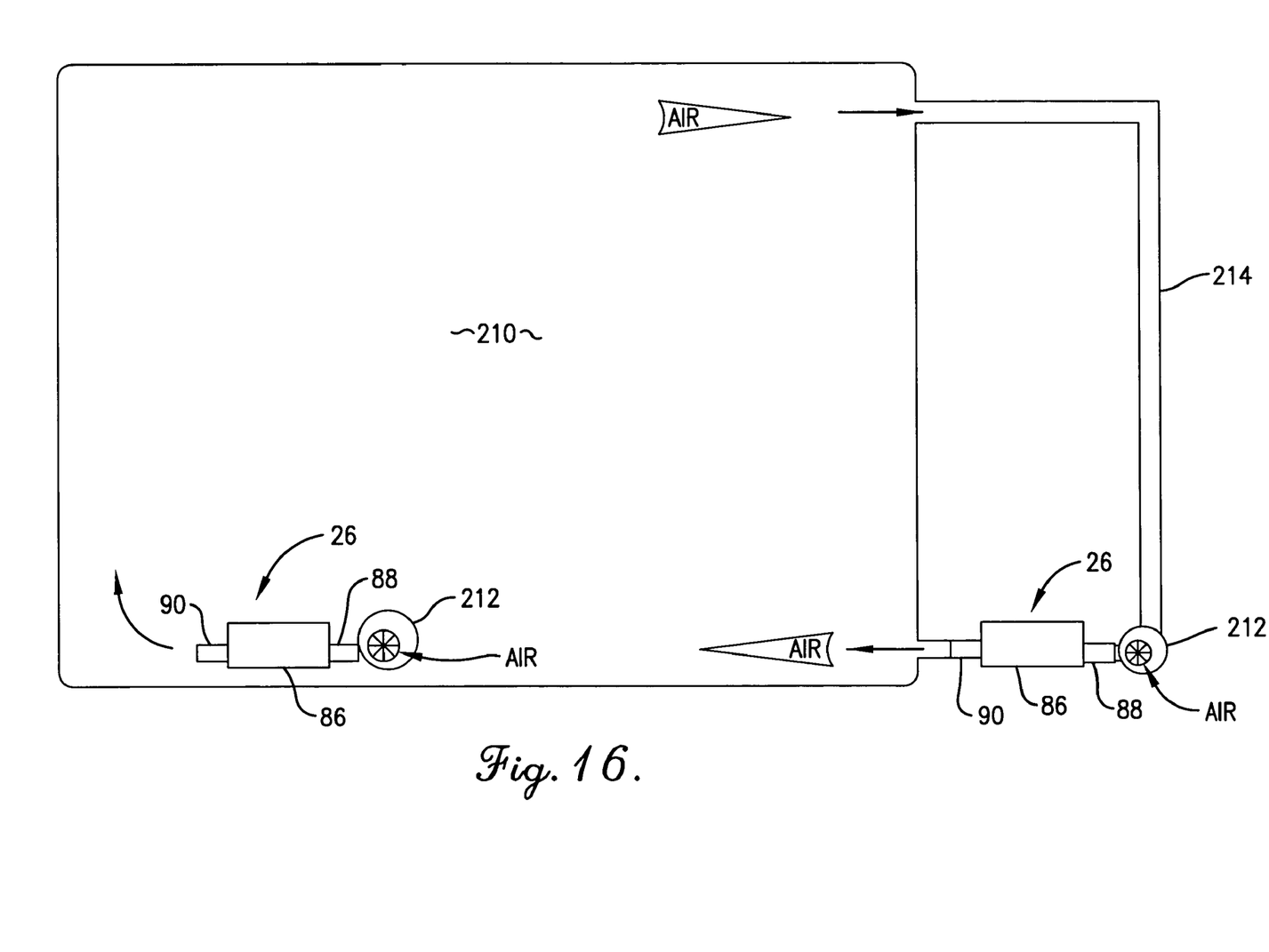
FIG. 16 is a schematic view of the exhaust gas cooling and particulate scrubbing system used in removing particulate matter and humidifying ambient air supplied within or to a room.

FIG. 16 shows another use of the direct exhaust gas cooling and scrubbing device 26 of the present invention in the context of removing particulates and humidifying an interior space such as a building or a particular room 210 thereof. In this use, where ambient air is being passed through the device 26, it is not necessary to first cool the air by passing it through the intercooler 22. In using the device 26 as an air filter and humidifier, the device 26 may be placed within a room 210 or fluidically connected to a room 210 to deliver conditioned air. In such uses, a blower 212 is connected to the entry pipe 88 of the device 26 in order to provide a flow of air through the body 86. The blower 212 may be of any conventional type suitably sized for the device 26 and the volume of air to be directed therethrough, ranging from a small blower of the type typically used in hair dryers to large industrial blowers. The air flows through the spargers 104 under pressure, whereby particulates in the air come in contact with the cooling liquid 44. The cooling liquid 44 would be primarily water in such an application, in order to provide humidity to the room 210 and avoid the introduction of undesired chemicals, although it is to be understood that air fresheners, disinfectants, or other liquid compositions could be included in small quantities as desired. The air is conditioned by passage through the chambers 92 and 94 whereby the particulates may be trapped by the water and retained in the chambers. The conditioned and humidified air then leaves through the exit pipe 90, where it may be passed to the room 210 either directly or through ducting. A return duct 214 may be provided whereby the air within the room 210 may be returned to the device 26 and may be mixed with ambient air. Advantageously, the device 26 may be used in combination with other filters such as fiber filters including those commonly known as HEPA filters which may be placed either on the entry or exit side of the device 26.

At the present, I have only observed a cooling effect on the exhaust gas and a much less noxious odor coming from the exhaust system when testing the system of the present invention. In one test I have conducted using only the exhaust gas cooling and scrubbing device 20 connected to the exhaust system downstream of the muffler of a Toyota Corolla automobile, I observed substantial cooling of the exhaust gas. In this circumstance on a day with ambient temperatures of about 70° F., I measured the temperature of the exhaust gas at the exhaust manifold of the engine running at idle for ten minutes to be 350° F., with the temperature of the exhaust gas leaving the tailpipe after passing through the standard muffler to be 225° F. I then connected the exhaust gas cooling and scrubbing device 26 downstream of the muffler and operated the automobile at idle for an additional 60 minutes. I then measured the temperature of the gas leaving the device 26 at 85° F. I then disconnected the device 26 and operated the automobile for 20 minutes of highway driving at 70 to 80 miles per hour. After 20 minutes of such operation, I observed the temperature of the exhaust gas at the exhaust manifold to be 650° F., and the temperature of the exhaust gas leaving the muffler to be 350° F. I then connected the exhaust gas cooling and scrubbing device 26 to the exhaust system downstream from the muffler and drove an additional 10 minutes on the highway at speeds of 70-80 miles per hour. I then stopped and measured the temperature of the exhaust gas leaving the device 26 to be 125° F.

It is believed that subsequent testing will reveal further benefits from the system 20. This may include condensation and/or trapping of particulates from the exhaust gas, absorption of some of the exhaust gas by the water used as a cooling liquid medium, or reaction of some combustion byproducts with the water used as a liquid cooling medium. The ability to fill and drain the direct exhaust gas cooling and scrubbing device 26 thus has the benefit of permitting disposal of the cooling liquid as well as replenishing its supply. This ability to fill and drain the device 26 has additional benefits when the device 26 is used in an ambient air filtration and conditioning system, in that the dust, pollen and other particulates trapped in the cooling liquid 44 can be disposed of together with the water used as the cooling liquid and the cooling liquid quickly and economically refreshed with new water.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

For instance, although the shape of the intercooler 22 and scrubbing device 26 are described and illustrated herein as being substantially rectangular, the shape and size of the intercooler 22, scrubbing device 26, and any other system 20 element may be of any shape, form or size, such as triangular, circular, etc, and still remain within the scope of the present invention. Additionally, the scrubbing device 26 may include multiple chambers and reservoirs, such as a third chamber or third reservoir, in addition to the two chambers 92, 94 and two reservoirs 98a, 98b disclosed herein, and the reservoirs may be constructed to substantially circumscribe or even surround the chambers.

The inventor hereby states his intent to rely on the Doctrine of Equivalents to determine and assess the reasonably fair scope of his invention as pertains to any apparatus not materially departing from but outside the literal scope of the invention as set out in the following claims.

The invention claimed is:

1. In an automotive exhaust system, the improvement comprising a direct exhaust gas cooling and scrubbing device comprising:
    a body defining a chamber and a passage for directing exhaust gas to the chamber;
    a liquid cooling medium held within the chamber and operable to be in direct contact with exhaust gas; and
    a sparger including a gas-diffusing wall having a plurality of holes therein,
    said sparger including a removable gas-diffusing cartridge mounted in the body and overlying the wall, said cartridge being configured and oriented to receive and pass therethrough exhaust gas exiting the holes of the wall,
    said wall and removable cartridge being submerged in the liquid cooling medium so as to cooperatively diffuse the exhaust gas into the liquid cooling medium.

2. An automotive exhaust system as set forth in claim 1, said removable cartridge including a sparging material having at least one gas-diffusing layer adapted to permit the flow of exhaust gas therethrough.

3. An automotive exhaust system as set forth in claim 2, said at least one gas-diffusing layer comprising material selected from the group consisting of a mesh screen, steel wool, glass fiber wool, and combinations thereof.

4. An automotive exhaust system as set forth in claim 2, said removable cartridge including a frame receiving the sparging material, said cartridge presenting an opening for inserting or removing the sparging material therethrough.

5. An automotive exhaust system as set forth in claim 4, said frame including a mounting tab, said body including a mount that engages the mounting tab and thereby at least partly attaches the removable cartridge to the body.

6. An automotive exhaust system as set forth in claim 4, said frame presenting opposite open areas that overlie one another with said sparging material positioned between said open areas such that the exhaust gas may pass through said open areas and through said sparging material.

7. An automotive exhaust system as set forth in claim 1, wherein said direct exhaust gas cooling and scrubbing device includes a reservoir adapted for holding a quantity of the liquid cooling medium and separated from said chamber by a wall, and having at least one passage fluidly communicating between said reservoir and said chamber for supplying the liquid cooling medium from said reservoir to said chamber.

8. An automotive exhaust system as set forth in claim 7, including a flow regulating device for adjusting a flow of the liquid cooling medium from said reservoir to said chamber.

9. An automotive exhaust system as set forth in claim 8, said flow regulating device comprising a shiftable element mounted for movement relative to said at least one passage for selectively restricting the flow of liquid cooling medium through the at least one passage.

10. An automotive exhaust system as set forth in claim 1, said body defining a plurality of chambers in fluid communication with one another and having at least one opening positioned in spaced relationship to the liquid cooling medium and oriented for enabling a flow of exhaust gas from a first of said chambers to a second of said chambers.

11. An automotive exhaust system as set forth in claim 10, said body defining a plurality of reservoirs, with each of the plurality of reservoirs being in fluid communication with a corresponding one of the chambers.

12. An automotive exhaust system as set forth in claim 10, wherein said body includes a top wall and wherein said chambers are separated by a partition having an opening therein, said opening being positioned proximate said top wall.

13. A conditioning device for conditioning ambient air comprising:
   a body defining a chamber, said body including an inlet and exit and a passage fluidly connected to the inlet and exit for directing a flow of air into the chamber;
   a liquid cooling medium primarily consisting of water, said liquid cooling medium being held within the chamber and operable to be in direct contact with air;
   a sparger positioned within the body for dispersing and directing the flow of air into the liquid medium,
   said sparger including an air-diffusing wall having a plurality of holes therein,
   said sparger including a removable air-diffusing cartridge mounted in the body and overlying the wall, with air being configured to pass through the wall and cartridge,
   said wall and removable cartridge submerged in the liquid cooling medium so as to cooperatively diffuse the air within the liquid cooling medium; and
   a blower for pumping air into the chamber for passage through the liquid cooling medium in direct contact with the liquid cooling medium.

14. A conditioning device as set forth in claim 13, said removable cartridge including a sparging material having at least one gas-diffusing layer adapted to permit the flow of air therethrough.

15. A conditioning device as set forth in claim 14, said at least one gas-diffusing layer comprising material selected from the group consisting of a mesh screen, steel wool, glass fiber wool, and combinations thereof.

16. A conditioning device as set forth in claim 15, said removable cartridge including a frame receiving the sparging material, said cartridge presenting an opening for inserting or removing the sparging material therethrough.

17. A conditioning device as set forth in claim 16, said frame including a mounting tab, said body including a mount that engages the mounting tab and thereby at least partly attaches the removable cartridge to the body.

18. A conditioning device as set forth in claim 16, said frame presenting opposite open areas that overlie one another with said sparging material positioned between said open areas such that airas may pass through said open areas and through said sparging material.

19. A conditioning device as set forth in claim 13, wherein said body includes a reservoir adapted for holding a quantity of the liquid cooling medium and separated from said chamber by a wall, and having at least one passage fluidly communicating between said reservoir and said chamber for supplying the liquid cooling medium from said reservoir to said chamber.

20. A conditioning device as set forth in claim 19, including a flow regulating device for adjusting a flow of the liquid cooling medium from said reservoir to said chamber.

21. A conditioning device as set forth in claim 20, said flow regulating device comprising a shiftable element for restricting the flow of liquid cooling medium through the at least one passage.

22. A conditioning device as set forth in claim 13, said body defining a plurality of chambers in fluid communication with one another and having at least one opening positioned in spaced relationship to the liquid cooling medium and oriented for enabling a flow of air from a first of said chambers to a second of said chambers.

23. A conditioning device as set forth in claim 22, said body defining a plurality of reservoirs, with each of the plurality of reservoirs being in fluid communication with a corresponding one of the chambers.

24. A conditioning device as set forth in claim 13, wherein said body includes a top wall and wherein said chambers are separated by a partition having an opening therein, said opening being positioned proximate said top wall.

25. In an automotive exhaust system, the improvement comprising a direct exhaust gas cooling and scrubbing device comprising:
   a body defining a chamber for holding liquid cooling medium, a chamber gas inlet for directing exhaust gas to the chamber, and a chamber gas outlet for directing exhaust gas out of the chamber;
   said body defining a refillable reservoir for holding liquid cooling medium,
   said body defining a passage that fluidly connects the chamber and reservoir, with liquid cooling medium being configured to flow through the passage, and
   a flow regulating device mounted to said body and operatively positioned between the reservoir and the chamber for adjusting a flow of liquid cooling medium through the passage from the reservoir to the chamber, said flow regulating device including a shiftable element for selectively restricting the flow of liquid cooling medium from the reservoir to the chamber,
   said chamber and reservoir being fluidly connected between the inlet and outlet in a non-series arrangement so that exhaust gas is permitted to flow substantially only through the chamber.

26. An automotive exhaust system as set forth in claim 25, said body presenting an external fill port that fluidly communicates with the reservoir for permitting liquid cooling medium to be added to the reservoir.

27. An automotive exhaust system as set forth in claim 25, said body defining a plurality of chambers in fluid communication with one another for enabling a flow of exhaust gas from a first of said chambers to a second of said chambers.

28. An automotive exhaust system as set forth in claim 27, said body defining a plurality of reservoirs, with each of the plurality of reservoirs being in fluid communication with a corresponding one of the chambers.

29. An automotive exhaust system as set forth in claim 27, said plurality of chambers being fluidly connected between the chamber gas inlet and the chamber gas outlet in series and whereby said body is configured for directing a flow of exhaust gas sequentially through the plurality of chambers.

30. An automotive exhaust system as set forth in claim 29, said body including a top wall and wherein said chambers are separated by a partition having an opening therein, said opening being positioned proximate said top wall.

* * * * *